United States Patent Office
3,429,906
Patented Feb. 25, 1969

3,429,906
METAL CHELATES OF BICYCLONONANEDIONE
Andrew A. Swigar, Nesquehoning, and Robert A. Walde, Emmaus, Pa., assignors to Air Products and Chemicals, Inc., a corporation of Delaware
No Drawing. Filed July 9, 1965, Ser. No. 470,882
U.S. Cl. 260—435          7 Claims
Int. Cl. C07f 7/24, 7/22; A01n 9/00

ABSTRACT OF THE DISCLOSURE

Metal chelates of bicyclononanedione tetracarboxyesters are prepared by reaction of the ester in non-aqueous organic solvent under acid to neutral conditions with a metal salt of a chelate-forming metal and adjusting to higher pH for precipitation of the chelate. These new chelate compounds are indicated to be useful among other things in catalysts, algaecides in paint formulations, and certain of the compounds are also useful as bactericides and fungicides.

The instant invention relates to novel metalloorganic compositions further characterized as solid, thermally stable metal chelates and to methods of preparing such compositions.

In a copending application, Ser. No. 470,774, filed concurrently herewith, the use of certain metal chelates of bicyclononanedione tetracarboxylic tetramethyl ester (BCN) as ultra-violet ray absorbing materials is disclosed. Only a select number of BCN metal chelates effectively act as ultra-violet absorbents. It has been discovered, however, that BCN metal chelates are of significant value in various applications such as catalysts, components of catalyst formulations, paint dryers, motor fuel anti-knock agents, textile dyeing aids, etc. These BCN metal chelates may also be used for parenteral injections to control fungal infections; as fungicides; as carriers for micronutrients in plant nutrition for valuable crops, ornamental trees and plants and to combat certain deficiencies in human and animal nutrition. Additionally, these metal chelates may be used to either augment or reduce the concentration of metal ions in a system as well as establish a metal ion buffer system which leads to sustained metal control not otherwise obtainable.

An object of the present invention is the synthesis and use of solid, thermally stable metal chelates of bicyclononanedione tetracarboxylic tetramethyl ester (BCN).

A further object of the present invention is the synthesis of metal chelates of BCN of high purity by precipitation of the metal chelate from solution.

Another object of the present invention is the development of polymeric metal chelates of BCN wherein the chelating metal has a valence value of at least two.

Still another objective of the present invention is the production of metal derivatives of BCN comprising metal-BCN chelates and metal-BCN carboxylates.

These and other objectives of the instant invention will be apparent from the following description and examples.

In accordance with the present invention we have discovered certain new and useful solid metal chelates of 3,3,1 - bicyclononane-2,6-dione-1,3,5,7-tetracarboxy tetramethyl ester coming within the scope of the structural formula

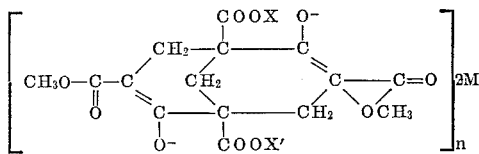

where $n$ is an integer greater than one and is equal to the valence value of M, where M is a metal ion of a chelate-forming metal having a valence value of 2 or 3, and wherein X and X' are independently selected from the group consisting of $C_1$ to $C_4$ alkyl groups, aryl groups including phenyl and substituted phenyl groups, amino groups and salt-forming metal ions. These metal-BCN chelates may be prepared by first dissolving BCN in a solution preferably in hot or boiling methanol; adding an acidic material, when necessary, to reduce the pH of the solution to a value below 7 and to a pH value as low as 2; adding a miscible solution of a salt of the chelate-forming metal; and adjusting the pH to a value of between 7 and 10 by the addition of a base, thereby effecting the precipitation of metal-BCN chelate which is then recovered as a solid product by filtration, washing and drying. The synthesis of BCN and its metal chelates is shown schematically and described herewith:

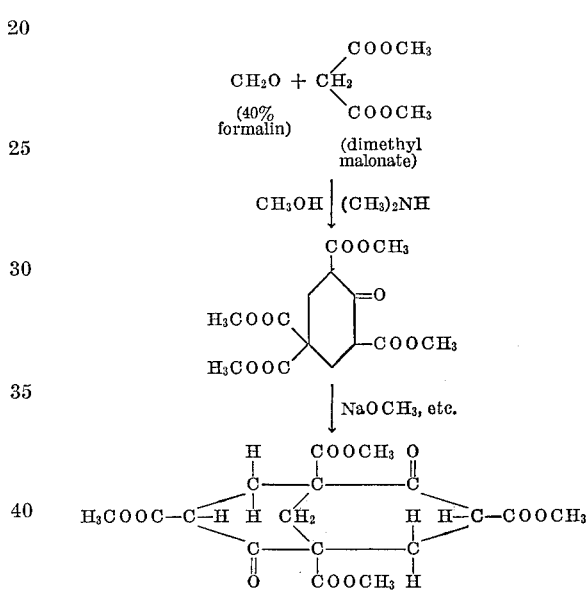

3,3,1-bicyclononane-2,6-dione-1,3,5,7-tetracarboxylic-tetramethyl ester (BCN)

(BCN) is itself, not a novel organic compound. Its detailed synthesis from formaldehyde and dimethyl malonate in the presence of methanol and dimethyl amine has been reported on several occasions and as early as 1913 by Meerwein et al.[1] Complete analysis has shown the structure of the compound to be

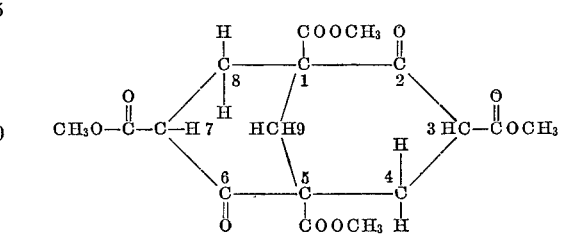

The compound has keto groups in the 2, 6-position, each in beta relationship to two carbomethoxy groups and having active hydrogen atoms in the 3–7 positions, giving a polyfunctional structure. Chelation probably pro- ---
[1] Annallen der Chemie, 398, 196 (1913), Jour. fur Pract. Chemie [2], 104, 171–205 (1922).

ceeds from an intramolecular keto-enol shift and the subsequent bonding with a divalent or higher valent metal:

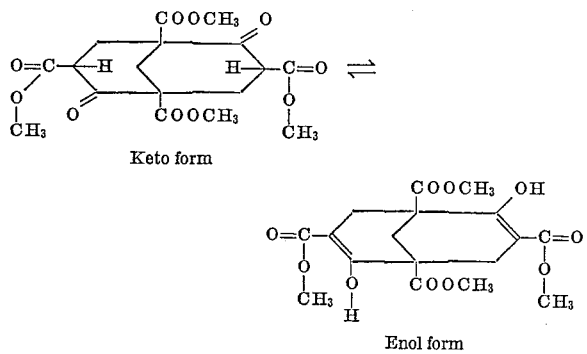
Keto form

Enol form

With divalent or polyvalent metal ions and a difunctional (bidentate) molecule, polymeric metal chelates are formed

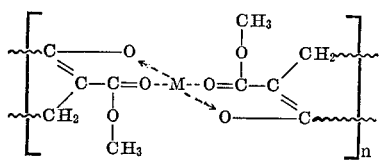

where $n$ represents at least one such complex. This is borne out by the low solubility of these metallo-organic compositions in solvents such as benzene, methanol and chloroform. Solubilities at ambient temperature are in the range of 4 to 700 mg. of metal chelate per 100 cc. of solvent.

Metal-BCN chelate synthesis has been effected in both aqueous-alcoholic and alcoholic solvents in a mildly alkaline medium at temperatures from abient to 60° C. Metallic ions which have been successfully chelated with BCN, as illustrative of chelate formation include:

$Fe^{+2}$, $Fe^{+3}$, $Cu^{+2}$, $Ni^{+2}$, $Al^{+3}$
$Mn^{+2}$, $Cr^{+3}$, $Cd^{+2}$, $Zn^{+2}$, $Bi^{+3}$
$Pb^{+2}$, $Sn^{+2}$, $Co^{+2}$, $Hg^{+2}$ and $ZrO^{+2}$ Other metal ions related to the above are similarly usable.

A general preparative method for the production of precipitated solid chelates and several modified methods of metal-BCN chelate synthesis are given in the following examples.

Example 1

5.0 grams of (BCN) were dissolved in 150 cc. of hot methanol at reflux and 7.0 grams of $Cd(Ac)_2 \cdot 2H_2O$ in methanol were added. Sodium methylate in alcohol was then added to pH 8.0 to precipitate the chelate. The solid product was filtered hot, washed with methanol, and dried in an oven at 95° C. A yield of 7.1 grams of a white solid was obtained analyzing at 29.11% by weight $Cd^{++}$.

Example 2

In a 2 l. beaker 20 g. of BCN were dissolved in 600 cc. of boiling methanol. Nitric acid was added dropwise until a pH of 2 was reached. 20 g. of lead acetate·$2H_2O$, dissolved in 300 cc. of methanol was then added and the pH adjusted to 8 by the addition of sodium methoxide. The white precipitate then formed was filtered at room temperature, washed with methanol and air-dried overnight, 29.58 grams of a product analyzing at 36.94% by weight lead were obtained; theoretical lead content being 35.5% by weight.

Example 3

10 grams of (BCN) were dissolved in 300 cc. of anhydrous methanol at reflux and acidified with a few drops of 96% sulfuric acid. 4.6 grams of pyrrolidine were added, followed by the addition of 8.5 grams of ferric chloride·$6H_2O$ in anhydrous methanol. The molar ratio of $Fe^{++}$ to BCN was 3.6/2.0. Additional pyrrolidine was added to adjust the pH to 8, whereupon the iron chelate precipitated completely. The product was filtered hot, washed with methanol, and dried at room temperature.

The reaction yielded 15.5 grams of a light brown product analyzed at 20.75% by weight $Fe^{++}$.

Example 4

One gram of (BCN) was dissolved in 50 cc. of absolute methanol at its boiling point and acidified with a few drops of 96% sulfuric acid. 1.6 grams of cobalt nitrate·$6H_2O$ dissolved in 20 ml. of absolute methanol were added to the hot solution followed by addition of pyrrolidine to pH 8. The cobalt chelate precipitate thus formed was filtered hot, washed with absolute methanol, and air dried. 1.20 grams of product were obtained analyzing at 15.0% by weight cobalt; theoretical cobalt being 13.3% by weight.

Example 5

5.0 grams of BCN were dissolved in 150 cc. of absolute methanol at its boiling point. Sufficient diethyl amine was added to adjust the pH to 8, followed by addition of 5.85 grams of stannous chloride·$2H_2O$ in solution. The molar ratio of tin to BCN was 2.0/1.0. Additional diethyl amine was again added to adjust the pH to 8, whereupon the tin chelate precipitated and was filtered, washed with absolute methanol, and dried in the oven at 110° C. The material was white on filtering and turned yellow on drying in the oven. 6.85 grams of product were obtained having a tin content of 23.2% by weight; theoretical Sn being 23.7 wt. percent.

Example 6

1.0 gram of BCN was dissolved in 30 cc. of methanol at its boiling point. 2.0 grams of lead acetate·$3H_2O$ in methanol were added (molar ratio of metal to BCN was 1.0/1.0) followed by pyrrolidine addition to pH 8. The precipitated material was filtered off hot, washed with methanol, and dried in the oven at 95° C. 0.7 gram of a white solid was obtained having a lead content of 36.58% by weight; theoretical Pb being 35.05% by weight.

Example 7

10.0 grams of BCN were dissolved in 250 cc. of boiling ethyl alcohol containing 3.5 grams of sodium methylate. 50 ml. of 10% $CuCl_2 \cdot 2H_2O$ dissolved in ethanol were added to the solution at the boiling point. A green solid material precipitated and was filtered at room temperature. It was washed with ethanol and dried in an oven at 95° C. 10.84 grams of product were obtained which analyzed at 13.04% by weight $Cu^{++}$.

Analysis of the various prepared chelates for metal content has shown that, on the average, they achieve the theoretical stoichiometry shown in the following table.

Molar Ratio of BCN to Metal Ion Normally Resulting from a Chelation Reaction

| BCN⁻ | M⁺⁺ | M⁺⁺⁺ |
| --- | --- | --- |
| 1 | 1 | |
| 3 | | 2 |

It is noteworthy that the metal chelates of the invention are precipitated under controlled pH in the range of 7 to 10 and preferably at a pH of about 8, by which means true metal chelates are precipitated in optimum yield essentially uncontaminated with salts of the metal used or metal salts of (unchelated) BCN. Earlier investigations, cited above, have reported reacting solutions of copper salts with ammonia and an aqueous alcoholic solution of BCN. This combination yielded a light green solution which, on drying, yielded copper salts and certain basic salts. No analyses for copper content were reported. In repeating these reported runs, a product, obviously containing all the copper introduced in the reaction, was found to have a 40% by weight copper content. In the Meerwein reaction, copper might be present as unreacted copper salt, as copper-BCN carboxylates, where all four of the carboxyl groups might be reacted, or possibly as a copper-ammonia complex, In contrast to this, our metal (copper) BCN chelate was precipitated from solution as a green solid on bringing the solution to a pH of about 8 by adding bases such as sodium methoxide, dimethyl amine, diethyl amine or pyrrolidine. The green precipitate on being washed and dried was essentially free of inorganic salt. On analysis it was shown to have a copper content of 16% by weight, with 14.25% by weight being the theoretical copper content for the Cu-BCN chelate.

Table I lists a cross-section of various metal chelates of tetracarbomethoxy-diketo-bicyclononane which have been prepared. This table indicates the (1) general method of preparation, (2) reaction temperature (ambient or at the boiling point of methanol), (3) type of acid used if preacidified, (4) molar ratio of metal to BCN and (5) metal analysis, compared to the theoretical amount calculated for formation of the chelate.

TABLE I

| Metal | Method of Preparation [1] | Molar Ratio Metal/BCN | Theoretical Wt. Percent Metal for BCN Chelate | Actual Metal Analysis (wt. percent) |
|---|---|---|---|---|
| $Fe^{+++}$ | 6, Cold | 3.6/2.0 | 8.83 | 8.54 |
| $Fe^{+++}$ | 6, Hot | 3.6/2.0 | 8.83 | 7.80 |
| $Fe^{+++}$ | 4, $H_2SO_4$, Hot | 3.6/2.0 | 8.83 | 6.90 |
| $Fe^{+++}$ | 4, HAc, Cold | 3.6/2.0 | 8.83 | 10.60 |
| $Co^{++}$ | 6, Cold | 0.5/1.0 | 13.31 | 13.70 |
| $Co^{++}$ | 6, Hot | 0.5/1.0 | 13.31 | 13.30 |
| $Co^{++}$ | 4, $H_2SO_4$, Hot | 0.5/1.0 | 13.31 | 15.00 |
| $Al^{+++}$ | 6, Hot | 4.0/2.0 | 4.47 | 4.20 |
| $Fe^{++}$ | 6, Hot [2] | 1.0/1.0 | 12.72 | 13.1 |
| $Fe^{++}$ | 6, Hot [3] | 1.0/1.0 | 12.72 | 13.1 |
| $Al^{+++}$ | 4, $H_2SO_4$, Hot | 4.0/2.0 | 4.47 | 5.02 |
| $Al^{+++}$ | 4, HAc, Hot | 4.0/2.0 | 4.47 | 6.70 |
| $Pb^{++}$ | 6, Hot | 1.0/1.0 | 35.05 | 36.58 |
| $Sn^{++}$ | 5, Hot | 2.0/1.0 | 23.70 | 23.2 |

[1] Methods of preparation (indicating sequence of addition):
Method 4—BCN+acid+metal ions+pyrrolidine or diethylamine.
Method 5—BCN+pyrrolidine or diethylamine+metal ions.
Method 6—BCN+metal ions+pyrrolidine or diethylamine.
[2] Metal in solution of $FeCl_2$ not neutralized before addition.
[3] Metal ion solution of $FeCl_2$ neutralized with diethylamine before addition.

The cross-linked metal chelates are extremely stable, having high melting points, and the metal is held in firm bond—the reaction actually clawing (chelating) metal ions out of solution. Thus, metal chelates, such as the chelates of BCN, may be used to bind or remove certain metal cations down to trace quantities in analytical applications and to sequester certain toxic cations such as lead and plutonium when such toxicants are present, for example, in the human system.

The metal chelates will undergo decomposition at a pH of 2 to release metal ions. They undergo thermal decomposition in the range of 200–500° C. to produce nascent metal in an inert atmosphere or metal oxide in air. They will also undergo exchange reactions with more active metals and are reduced by aluminum alkyls and sodium borohydride.

In the above examples of metal-BCN-chelate formation, BCN and the salt of a chelate forming metal were dissolved in anhydrous methanol and reacted. However, aside from methanol, which was seelcted for its high solvency and relatively low boiling point, other anhydrous organic solvents can be used provided they have adequate solubility for the metal salts and BCN used. It has similarly been shown to be preferable to first prepare BCN in an acidic medium by adding an acid to the methanol solution and then adding a base carefully to bring the system to a pH above 7 and preferably to a pH of 8. While addition of acids to effect acidification is not critical, acids that have been used advantageously include nitric, sulfuric and hydrochloric (from hydrolyzable chloride salts). However, other inorganic or organic acids or acid salts can be used to effect acidification. Bases used to bring the metal-BCN system to the optimum pH for precipitation include inorganic and organic bases such as sodium methylate, caustic soda, pyrrolidine, diethyl amine, dimethyl amine and the like. Other bases can be used effectively, including quaternary ammonium bases, provided they do not interfere with chelate formation by such metals as are prone to form metal amine or ammonia complexes.

It has been recognized, as disclosed in the aforementioned co-pending application, that certain metal chelates of BCN and particularly the lead chelate of BCN show excellent and unexpected stabilizing action in polymeric resins subjected to ultra-violet radiation. Also, whereas the lead-BCN chelate is an effective U.V. absorbent, per se, when coated on or impregnated in solids, its effectiveness as a U.V. absorber is even more pronounced when used in combination with formazan esters or amides.

Numerous other uses have been found for metal-BCN chelates. For example, metal oxide films formed by burning of the organic component of precipitated metal chelate show strong insulating properties and mechanical and dielectric strength as well as varying degrees of electrical rectification.

Example 8

A modified iron-BCN chelate was prepared by first reacting BCN with pentaerythritol (PE) by heating the reactants in the molten state. The polyester formed from a 1/1 PE to BCN mixture was insoluble and fairly temperature stable. On reaction with ferric ions in solution, the preformed polymer took on color, indicative of chelate formation. A methanol solution of this iron PE–BCN chelate, containing approximately 4% by weight iron ($Fe^{+2}$), when spread on glass formed thin films of resinous material. A sample which was heated to drive off the methanol formed a film showing good sensitivity to U.V. light as well as being a good dielectric. Thus, this material would make a capacitor having sensitivity to U.V. light.

One of the most unique properties exhibited by the metal chelates of this invention is their residual functionality in the form of two bridgehead carbomethoxy groups. These readily undergo hydrolysis to acid groups and in the presence of metal ions at acid pH, they form metal salts. In this manner the metal content of the metallo-organic complex can be doubled giving both chelated and salt-type metal attachment.

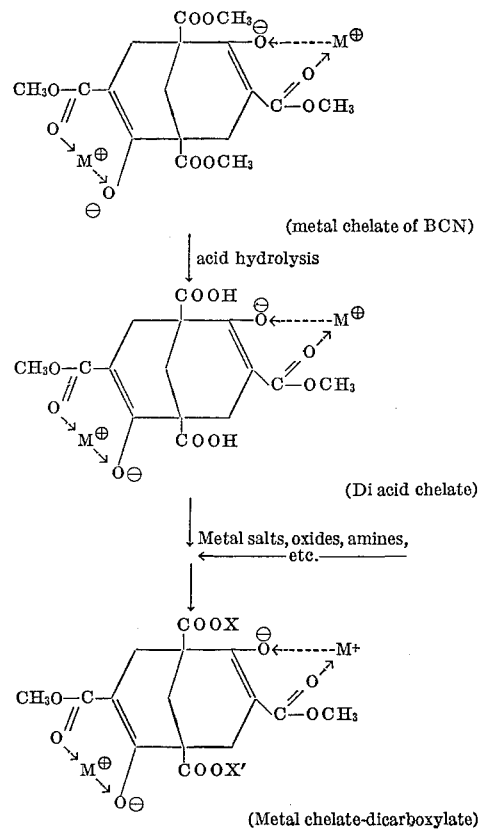

(metal chelate of BCN)

acid hydrolysis (Di acid chelate)

Metal salts, oxides, amines, etc.

(Metal chelate-dicarboxylate)

where X and/or X' are salt forming metal ions, amines, ammonium salts, etc.

Whereas certain carboxylate salts of BCN have been reported heretofore, namely the silver, sodium, barium, copper and iron salts, the high metal content compounds comprising metals combined with BCN both as metal chelates and metal salts are new compositions. Typical of such chelate-salt preparations are the following:

TABLE II

| Metal Ions | Method [1] | Molar Ratio M/BCN | Theo. Metal (wt. percent) Chelate Salt | Theo. Metal (wt. percent) Chelate | Actual Metal (wt. percent) |
|---|---|---|---|---|---|
| $Fe^{+3}$ | 4, $H_2SO_4$, cold | 3.6/2 | 17.4 | 8.8 | 12.3 |
| $Cu^{+2}$ | 3, $H_2SO_4$, hot | 2.0/1 | 26.4 | 14.2 | 23.5 |
| $Zn^{+2}$ | 3, $H_2SO_4$, hot | 2/1 | 27.0 | 14.6 | 23.9 |
| $CO^{+2}$ | 3, $H_2SO_4$, hot | 2/1 | 25.0 | 13.3 | 19.3 |
| $Co^{+2}$ | 4, $H_2SO_4$, cold | 0.5/1 | 25.0 | 13.3 | 15.7 |
| $Mn^{+2}$ | 3, $HNO_3$, hot | 2/1 | 23.7 | 12.5 | 20.5 |
| $Al^{+3}$ | 3, $HNO_3$, hot | 4/2 | 9.2 | 4.5 | 8.6 |
| $Al^{+3}$ | 4, $H_2SO_4$, cold | 4/2 | 9.2 | 4.5 | 8.7 |
| $Fe^{+2}$ | 6, hot [2] | 2/1 | 24.0 | 12.7 | 21.3 |
| $Fe^{+2}$ | 6, hot [2] | 2/1 | 24.0 | 12.7 | 20.6 |
| $Al^{+3}$ | 4, HOAc, hot | 4/2 | 9.22 | 4.5 | 6.7 |
| $Ni^{+2}$ | 3, $H_2SO_4$, hot | | 24.9 | 13.3 | 17.5 |
| $Bi^{+3}$ | 6, hot | 4/2 | 54.1 | 35.2 | 53.5 |
| $Sn^{+2}$ | 6, hot | 2/1 | 70.3 | 23.7 | 40.3 |

[1] Methods of preparation (sequence of addition):
Method 3—BCN+acid+pyrrolidine or diethyl amine+metal ions.
Method 4—BCN+acid+metal ions+pyrrolidine or diethyl amine.
Method 6—BCN+metal ions+pyrrolidine or diethyl amine.
[2] Metal ion solution of $FeCl_2$ neutralized with diethylamine before addition.

Metal salt formation based on the 1,5-carbomethoxy groups should preferably follow metal-BCN chelate formation. However, the high activity of the 1,5-carbomethoxy groups permits salt formation, when desired, by judicious operation prior to metal chelate formation. Since the formation of precipitated metal chelates is effected under mildly basic conditions and the formation of carboxylate salts is effected only after acid hydrolysis of the diester, the two reactions are preferably effected separately.

Such BCN metal salt-metal chelate compositions are of particular advantage where an appreciable water solubility is obtained in the metal chelate molecule due to the developed salt structure. Such chelate-salts are valuable, for example, in the copper form as algaecides in water cooling systems and in paint formulations, as in boat bottom paints; in the mercury, silver and tin chelate-salt form as biocides in controlling bacteria and fungi and in the iron, zinc and manganese chelate-salts form as effective plant nutrients.

Obviously, numerous modifications and variations of the invention as herein set forth may be made without departing from the spirit and scope thereof and therefore only such limitations should be imposed as are indicated in the appended claims.

What is claimed is:

1. Lead chelate of bicyclononanedione ester of the formula

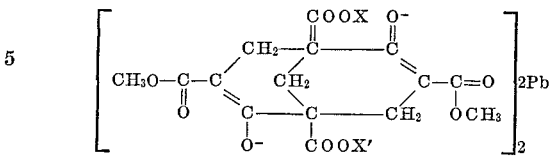

where X and X' are independently selected from the group consisting of $C_1$ to $C_4$, alkyl groups, aryl groups, amino groups and salt-forming metal ions.

2. The metal chelate of claim 1, wherein X and X' are methyl.

3. Metal chelate of bicyclononanedione ester of the formula

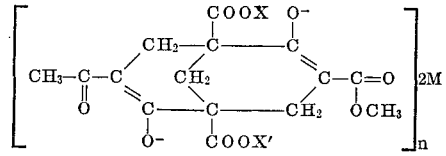

where n is an integer equal to the valence of M, M is a metal ion of a chelate-forming metal having a valence of 2 or 3, and where X and X' are salt-forming metal ions; the total metal content of said metal chelate consisting of
 (a) metal ions of the chelate-forming metals combined as metal chelates of bicyclononanedione ester and
 (b) metal ions of salt-forming metals combined as carboxylate salts of bicyclononanedione ester.

4. The method of preparing lead chelates of bicyclononanedione tetramethyl ester which comprises dissolving the bicyclononanedione ester in a non-aqueous organic solvent, adding acid to reduce the pH of the solution to a pH value of between 2 and 7, adding a miscible solution of a lead salt, adjusting the pH of the solution to a value of from 7 to 10 by the addition of a base, and separating precipitated chelate by filtration.

5. The method according to claim 4 wherein the bicyclononanedione ester is dissolved in methanol.

6. The method according to claim 4 wherein the acid is selected from the group consisting of nitric, sulfuric, hydrochloric, acetic and phosphoric acid.

7. The method of preparing lead chelate of bicyclononanedione tetramethyl ester which comprises: dissolving bicyclononanedione ester in methanol, adding nitric acid to attain a pH of about 2 in the solution, adding lead acetate(dihydrate) previously dissolved in methanol and adjusting the pH to between 7 to 10 by the addition of sodium methoxide and methanol to form a precipitate.

References Cited

Meerwein et al., Annalen, 398 (1913) pp. 196–198, 204, 223–9.

TOBIAS E. LEVOW, Primary Examiner.

A. P. DEMERS, Assistant Examiner.

U.S. Cl. X.R.

8—92; 88—106, 111; 106—310; 210—64; 252—63.5, 518, 386, 431; 260—45.75, 429, 429.7, 429.9, 430, 438.1, 439, 447, 448; 71—97

UNITED STATES PATENT OFFICE
CERTIFICATE OF CORRECTION

Patent No. 3,429,906                      February 25, 1969

Andrew A. Swigar et al.

It is certified that error appears in the above identified patent and that said Letters Patent are hereby corrected as shown below:

Column 1, lines 65 to 71, the right-hand portion of the formula should appear as shown below:

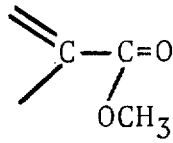

Column 8, lines 3 to 9, the portion of the formula reading

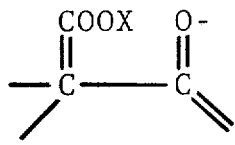      should read      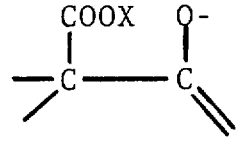

Signed and sealed this 31st day of March 1970.

(SEAL)
Attest:

EDWARD M. FLETCHER, JR.            WILLIAM E. SCHUYLER, JR.
Attesting Officer                   Commissioner of Patents